United States Patent
Kino et al.

(10) Patent No.: US 7,769,184 B2
(45) Date of Patent: Aug. 3, 2010

(54) APPARATUS AND METHOD FOR MEASURING SOUND FIELD

(75) Inventors: Yasuyuki Kino, Tokyo (JP); Akira Sakamoto, Tokyo (JP); Tokihiko Sawashi, Tokyo (JP); Koji Kobayashi, Kanagawa (JP); Masahiro Okuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 997 days.

(21) Appl. No.: 11/496,474

(22) Filed: Aug. 1, 2006

(65) Prior Publication Data

US 2007/0030978 A1 Feb. 8, 2007

(30) Foreign Application Priority Data

Aug. 3, 2005 (JP) ............................. 2005-224854

(51) Int. Cl.
*H04R 29/00* (2006.01)
*H04B 15/00* (2006.01)
*H03G 5/00* (2006.01)

(52) U.S. Cl. ....................................... 381/59; 381/94.1

(58) Field of Classification Search ............. 381/56–59, 381/98, 99, 94.1
See application file for complete search history.

(56) References Cited

U.S. PATENT DOCUMENTS 6,760,451 B1 * 7/2004 Craven et al. .................. 381/59

FOREIGN PATENT DOCUMENTS

| JP | 6-13292 | 2/1994 |
|---|---|---|
| JP | 6-337685 | 12/1994 |
| JP | 7-46687 | 2/1995 |
| JP | 7-212896 | 8/1995 |
| JP | 7-248255 | 9/1995 |
| JP | 2003-348699 | 12/2003 |

* cited by examiner

*Primary Examiner*—Ping Lee
(74) *Attorney, Agent, or Firm*—Oblon, Spivak, McClelland, Maier & Neustadt, L.L.P.

(57) ABSTRACT

A sound field measurement apparatus includes a signal generating unit for outputting a burst signal, a driving unit for driving a speaker using the burst signal, a microphone for picking up an audio output from the speaker, an analog-digital converter for performing analog-digital conversion processing on an output signal from the microphone and outputting picked-up audio data, a filtering unit for performing filtering processing on the picked-up audio data, and an analyzing unit for determining a propagation time of the audio output from the speaker to the microphone in accordance with data output from the filtering unit. In this sound field measuring apparatus, the filtering unit is an IIR filter configured to filter the picked-up audio data forward and then backward along a time axis, or an IIR filter configured to filter the picked-up audio data backward and then forward along the time axis.

3 Claims, 9 Drawing Sheets

APPARATUS AND METHOD FOR MEASURING SOUND FIELD

CROSS REFERENCES TO RELATED APPLICATIONS

The present invention contains subject matter related to Japanese Patent Application JP 2005-224854 filed in the Japanese Patent Office on Aug. 3, 2005, the entire contents of which are incorporated herein by reference.

BACKGROUND OF THE INVENTION

1. Field of the Invention

The present invention relates to sound field measuring apparatuses and sound field measuring methods which can be applied, for example, to car audio systems. In particular, the present invention relates to a sound field measuring apparatus and a sound field measuring method in which a speaker is driven using a burst signal so that sound is picked up by a microphone, and an output signal from the microphone is filtered using an IIR filter forward and backward along a time axis. This permits measurement of the propagation time of an audio output from a speaker, which is driven by a test signal, with a simple mechanism and high precision even in a high-noise environment.

2. Description of the Related Art

Recently, car audio systems have become available which are capable of providing audio contents with increased sound quality due to techniques such as the use of subwoofers and the correction of various characteristics using digital signal processors.

In regard to such techniques, Japanese Unexamined Utility Model Registration Application Publication No. H6-13292 describes a method in which a speaker is driven by a test signal and the output of the speaker is analyzed so that various characteristics of a sound field are measured. Then, the characteristics are adjusted on the basis of the results of the measurement. Specifically, in Japanese Unexamined Utility Model Registration Application Publication No. H6-13292, a technique is proposed for localizing a sound image with certainty. In this technique, an impulse signal is applied for the test signal, and the signal propagation times from a plurality of speakers to a microphone are measured. On the basis of the measured propagation times, a delay time is set for each speaker output.

Since a car audio system is generally used inside of a vehicle, i.e., a small and closed space, the characteristics of a sound field from the car audio system depend on the vehicle in which the system is installed. Therefore, it is necessary to appropriately adjust the characteristics of the sound field in accordance with vehicles. Thus, car audio systems are generally configured such that the sound field can be appropriately adjusted by user operations. The technique proposed in Japanese Unexamined Utility Model Registration Application Publication No. H6-13292 allows such sound field adjustment operations performed by users with increased precision and reduced complexity, thus enhancing operability.

However, a car audio system is usually used under a condition where much noise is present which originates from an air conditioning equipment, the engine, etc. Therefore, when an impulse signal is applied as the test signal for measuring the signal propagation time from a speaker to a microphone, as described above, the presence of noise can degrade the precision of the propagation time measurement.

As a countermeasure for this problem, a technique can be provided in which a burst signal instead of an impulse signal is used as a test signal. Since a burst signal is a sine wave signal having a single frequency, noise can be removed by filtering processing, which can increase the precision of measurement of the signal propagation time from a speaker to a microphone with reduced noise effect. For such filtering processing, a Finite Impulse Response (FIR) filter or an Infinite Impulse Response (IIR) filter can be used.

However, FIR filters have a disadvantage of complex filter configuration. On the other hand, IIR filters have a disadvantage of causing a phase delay, which can degrade measurement precision when applied in such propagation time measurement.

SUMMARY OF THE INVENTION

The present invention has been made in view of the above circumstances. Accordingly, a sound field measuring apparatus and a sound field measuring method which, when a speaker is driven by a test signal and the propagation time of an audio output from the speaker is measured, permits precise measurement of the propagation time with a simple mechanism even under a condition where much noise is present.

According to an embodiment of the present invention, a sound field measurement apparatus includes a signal generating unit for outputting a burst signal, a driving unit for driving a speaker using the burst signal, a microphone for picking up an audio output from the speaker, an analog-digital converter for performing analog-digital conversion processing on an output signal from the microphone and outputting picked-up audio data, a filtering unit for performing filtering processing on the picked-up audio data, and an analyzing unit for determining a propagation time of the audio output from the speaker to the microphone in accordance with data output from the filtering unit. In this sound field measuring apparatus, the filtering unit is an IIR filter configured to filter the picked-up audio data forward along a time axis and then filter the picked-up audio data backward along the time axis, or an IIR filter configured to filter the picked-up audio data backward along the time axis and then filter the picked-up audio data forward along the time axis.

A sound field measuring method according to an embodiment of the present invention includes the steps of driving a speaker using a burst signal, picking up an audio output from the speaker using a microphone, performing analog-digital conversion on an output signal from the microphone to generate picked-up audio data, performing filtering processing on the picked-up audio data, and determining a propagation time of the audio output from the speaker to the microphone in accordance with a result of the filtering processing. In this sound field measuring method, the filtering step includes a first filtering step of filtering the picked-up audio data forward along a time axis or backward along the time axis using an IIR filter, and a second filtering step of filtering the picked-up audio data which has undergone the first filtering step backward along the time axis or forward along the time axis using the IIR filter.

According to an aspect of the present invention, a sound field measurement apparatus is configured to have a signal generating unit for outputting a burst signal, a driving unit for driving a speaker using the burst signal, a microphone for picking up an audio output from the speaker, an analog-digital converter for performing analog-digital conversion processing on an output signal from the microphone and outputting picked-up audio data, a filtering unit for performing filtering processing on the picked-up audio data, and an analyzing unit for determining a propagation time of the audio output from the speaker to the microphone in accordance with data output from the filtering unit. In this sound field measuring apparatus, the filtering unit is an IIR filter configured to filter the picked-up audio data forward along a time axis and then filter the picked-up audio data backward along the time axis, or an IIR filter configured to filter the picked-up audio data backward along the time axis and then filter the picked-up audio data forward along the time axis. With this configuration, noise can be reduced or removed from the audio data more readily as compared with a case where a FIR filter is applied. In addition, a phase delay associated with the IIR filtering can be compensated by the repeated filtering processing, i.e., the filtering processing performed forward and backward along the time axis. This allows precise measurement of the propagation time with a simple mechanism even under a condition where much noise is present.

According to an embodiment of the present invention, a sound field measuring method can be provided which, when a speaker is driven using a test signal to measure the propagation time of an audio output from a speaker, permits precise measurement of the propagation time with a simple configuration even in a high noise environment.

According to an aspect of the present invention, measurement of the propagation time of an audio output from a speaker using a test signal which drives the speaker can be performed precisely with a simple configuration even under a condition where much noise is present.

DESCRIPTION OF THE PREFERRED EMBODIMENTS

In the following, the preferred embodiments of the present invention will be described with reference to the accompanying drawings.

Embodiment 1

(1) Configuration of Preferred Embodiment

Figure 2:
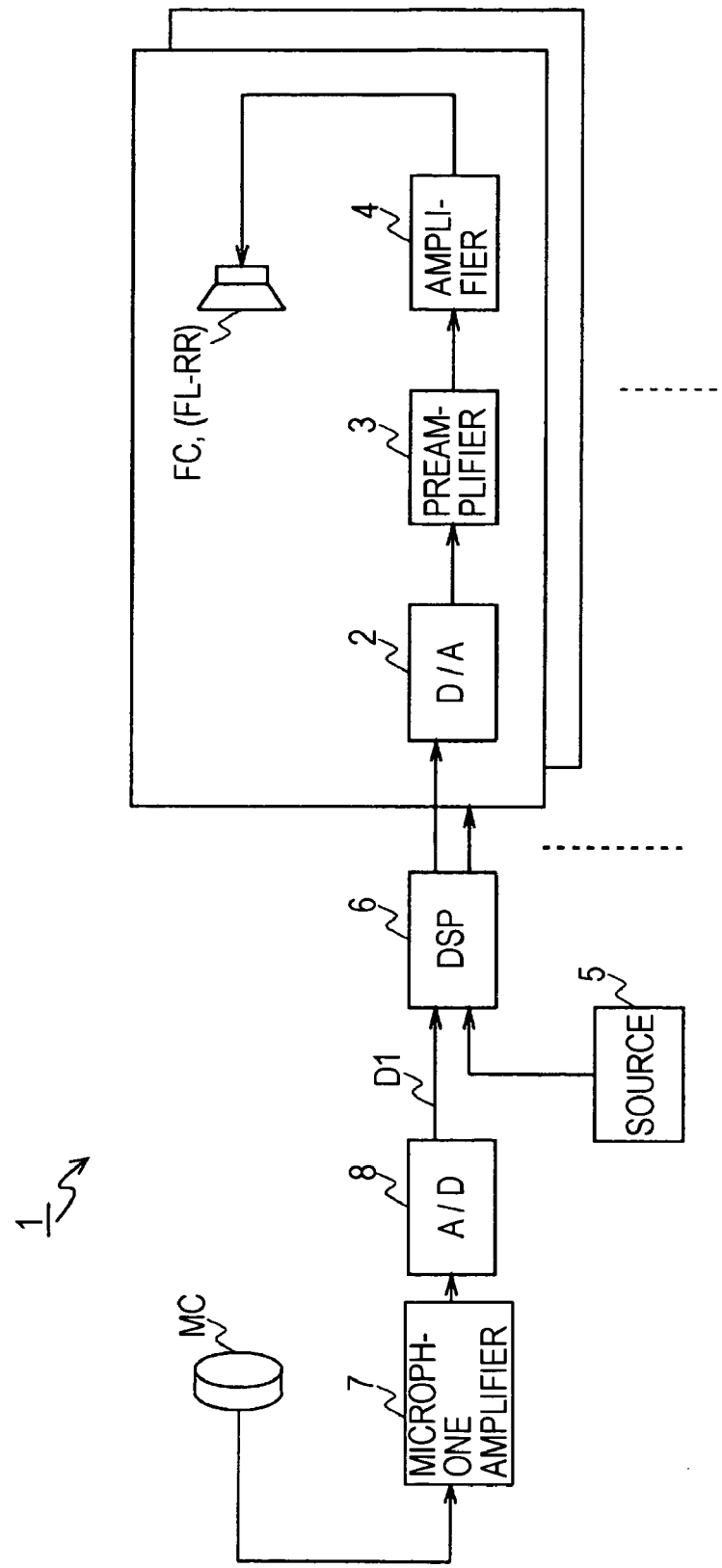
FIG. 2 is a block diagram illustrating a car audio system according to an embodiment of the present invention.
Figure 3:
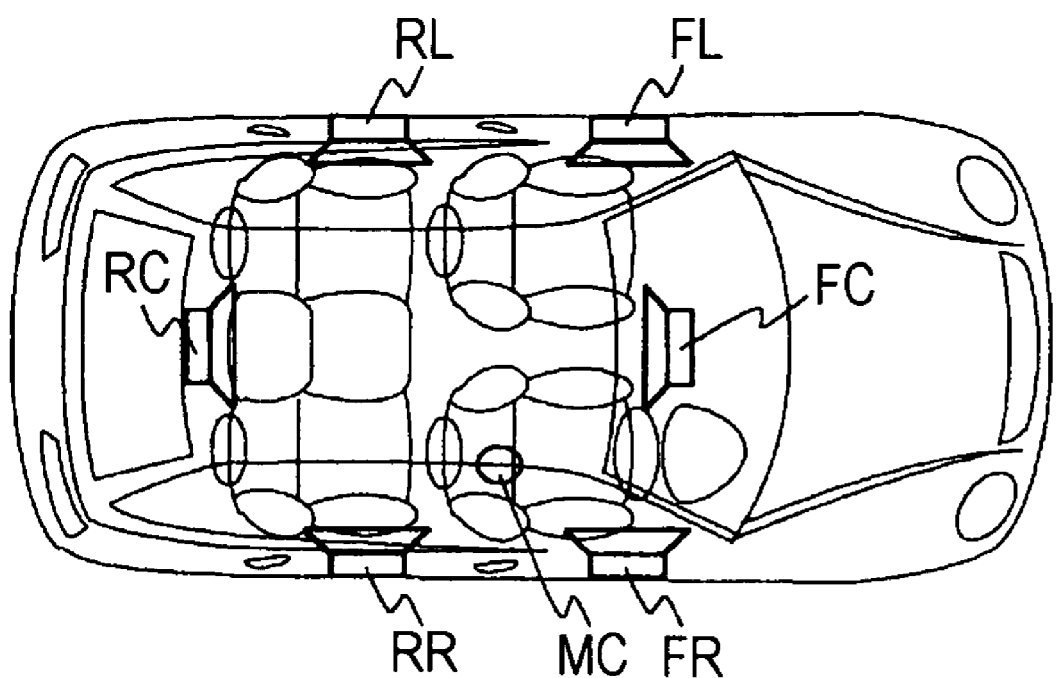
FIG. 3 is a plan view illustrating an arrangement of speakers of a car audio system inside a vehicle according to an embodiment of the present invention.

FIG. 2 is a block diagram illustrating a car audio system 1 according to an embodiment of the present invention. The car audio system 1 is configured to provide audio contents through 5.1 channel outputs. Thus, inside a vehicle as shown in FIG. 3, for example, the car audio system 1 has a front center channel speaker FC installed in a front center position, a front-right channel speaker FR and a front-left speaker FL installed in the front-right door and the front-left door, respectively, a rear-right channel speaker RR and a rear-left channel speaker RL installed in the rear-right door and the rear-left door, respectively, and a subwoofer RC installed in a rear center position. In addition, in the car audio system 1, a microphone MC for picking up audio output from each of the six speakers FC to RR is installed near the driver seat where a driver's head usually rests.

The car audio system 1, for each of the speakers FC to RR, includes a digital-analog converter (D/A converter) 2 for performing digital-analog conversion on audio data and outputting an audio signal, a preamplifier 3 for controlling a parameter such as a volume of the audio signal output from the D/A converter 2, and an amplifier 4 for driving the speaker using an output signal of the preamplifier 3. The car audio system 1 is also provided with a source 5 such as an optical disk player for providing audio contents and a digital signal processor (DSP) 6 for processing audio data output from the source 5 and output a result of the audio data processing to a channel for driving of each of the speakers FC to RR.

In this audio data processing, the DSP 6 corrects the characteristics of the audio data such as a frequency characteristic, thus correcting a sound field from each of the speakers FC to RR, so as to optimize a sound field formed by all of the speakers FC to RR. The DSP 6 executes a processing program for sound field setting in advance in accordance with a user instruction, so as to set a correction reference value for the audio data on the basis of audio output from each of the speakers FC to RR which is obtained through the microphone MC. In this embodiment, this processing program is preinstalled in the car audio system 1. However, such a processing program can be obtained through downloading via a network such as the Internet or from a recording medium such as an optical disk, a magnetic disk, and a memory card on which the processing program is recorded.

In the car audio system 1, a microphone amplifier 7 amplifies an output signal of the microphone MC with a predetermined gain and outputs an amplified signal. An analog-digital converter (A/D converter) 8 performs analog-digital conversion processing on the output signal of the microphone amplifier 7 and outputs picked-up audio data D1.

Figure 4:
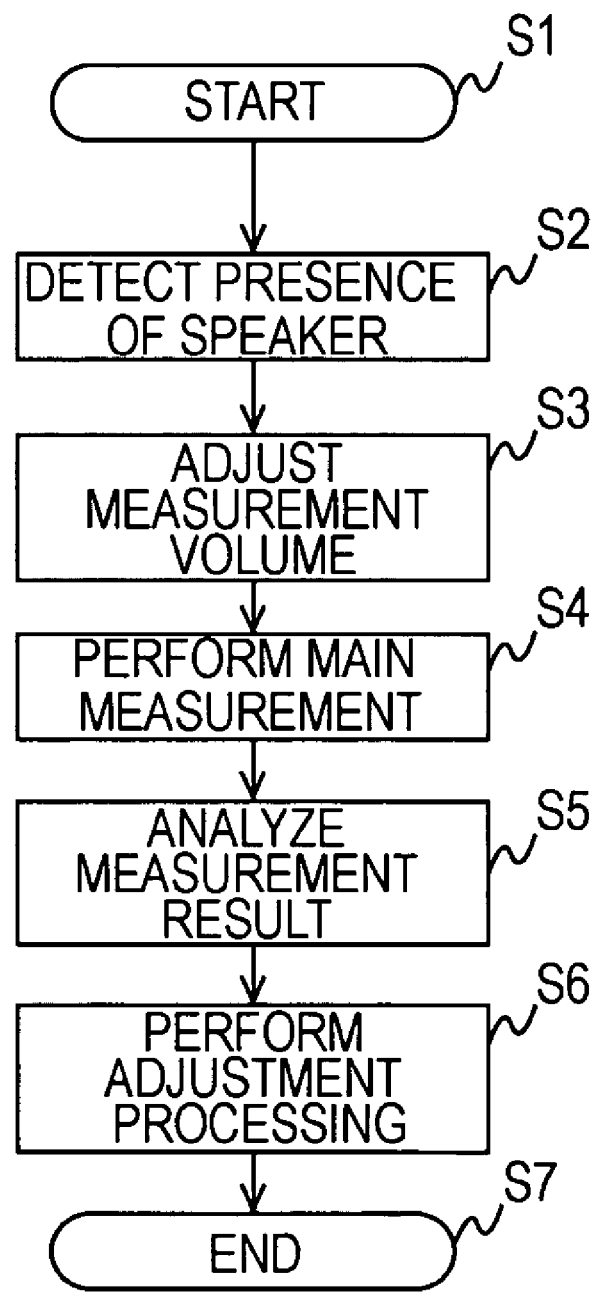
FIG. 4 is a flowchart illustrating a processing procedure performed by a digital signal processor of a car audio system.

Referring now to FIG. 4, a flowchart illustrates a processing procedure performed by the DSP 6 in accordance with the processing program for sound field setting. The DSP 6 initiates the processing procedure, at STEP S1, and performs processing for detecting the presence of each of the speakers FC to RR (speaker presence verification processing), at STEP S2. At this time the DSP 6 selectively and sequentially outputs a test signal to each of the channels of the speakers FC to RR and detects a change in a signal level of the picked-up audio data D1 corresponding to the test signal, so as to determine whether or not a response is obtained from the microphone MC and thus for each channel verify the presence of the individual speakers.

At STEP S3, the DSP 6 sets a volume applied for characteristic measurement for each channel. Similarly to the above, the DSP 6 selectively and sequentially outputs a test signal to each of the channels of the speakers FC to RR and determines a signal level of the picked-up audio data D1 corresponding to the test signal so as to set the volume applied for the characteristic measurement on the basis the result of the determination processing.

At STEP S4, the DSP 6 carries out processing for main measurement. The DSP 6 selectively and sequentially outputs a test signal to each channel and acquires the picked-up audio data D1 corresponding to the test signal and stores the picked-up audio data D1 to a memory provided in the DSP 6. At STEP S5, the DSP 6 analyzes the picked-up audio data D1 stored in the memory. In accordance with the analysis processing, the DSP 6 measures the propagation time of audio output from each of the speakers FC to RR to the microphone MC and also measures a frequency characteristic of the audio output of each the speakers.

At STEP S6, the DSP 6 sets an amount of correction applied to audio data for each of the channels on the basis of the results of the measurement mentioned above. From the measurement results, the DSP 6 uses the result of the propagation time measurement of the audio output from each of the speakers to the microphone MC, for setting a delay time for the audio data for each of the channels for output, so as to correct time differences which occur between the channels in terms of the time period necessary for the audio output from of the each speaker to be heard by a driver. With this arrangement, adjustment processing, which is so-called time alignment, is executed. In addition, the DSP 6 uses the result of the frequency characteristic measurement performed in STEP S5, so as to set a frequency characteristic for the correction of audio data so that the audio output from each of the speakers has an intended frequency characteristic. In this embodiment, this intended frequency characteristic is a flat frequency characteristic.

When the various characteristics are set as described above, the DSP 6 terminates the processing procedure at STEP S7, and then processes data audio data for each channel in accordance with these set characteristics.

Figure 1:
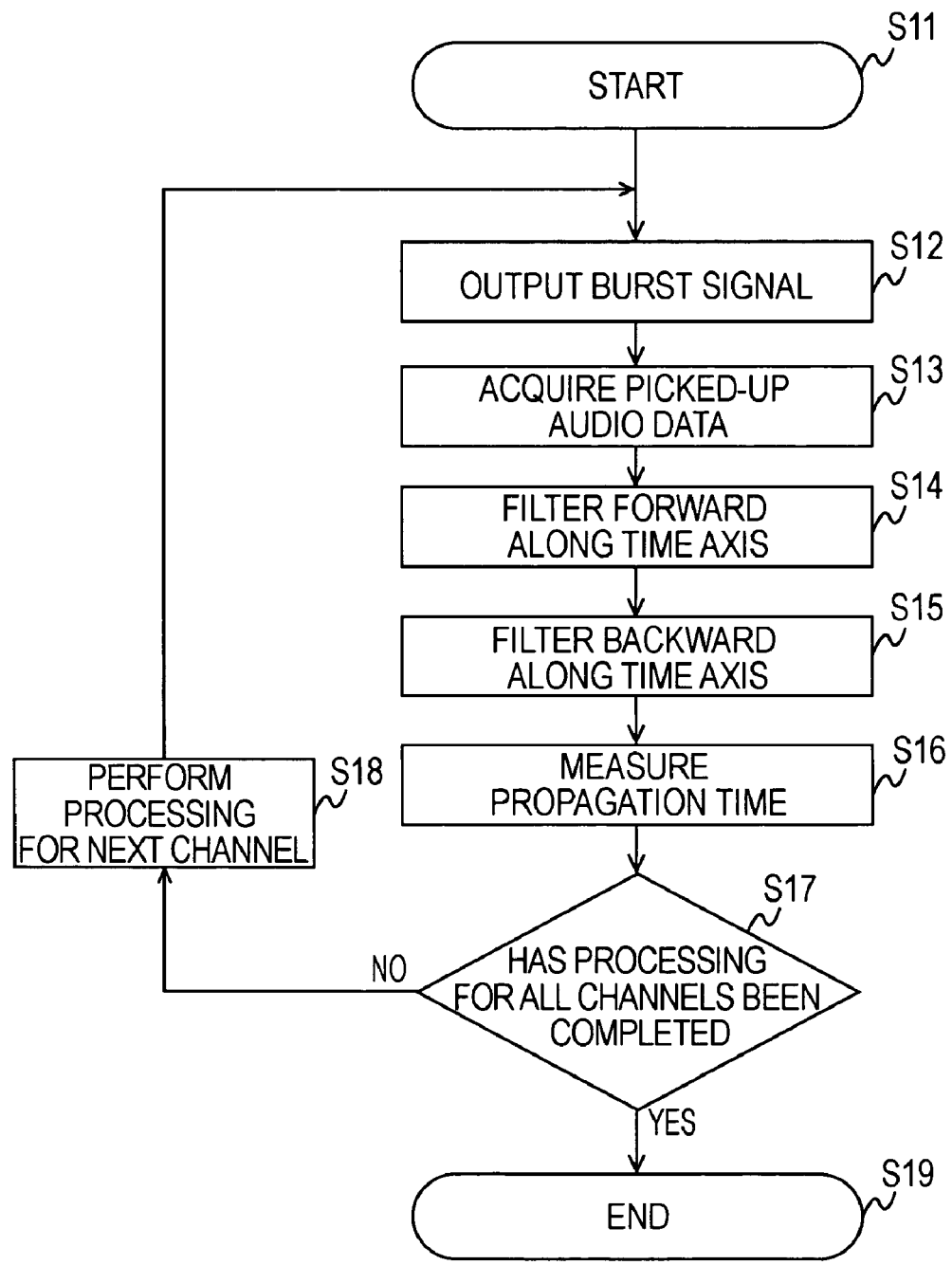
FIG. 1 is a flowchart illustrating a processing procedure of propagation time measurement performed by a digital signal processor of a car audio system according to an embodiment of the present invention.

Referring now to FIG. 1, a flowchart illustrates a processing procedure of the propagation time measurement performed by the DSP 6 in the main measurement processing of STEP S4 and the analysis processing of STEP S5. Upon initiating the processing procedure at STEP S11, the DSP 6 selects one of the channels of the six speakers FC to RR and then to the selected channel outputs a burst signal as the test signal generated by a signal generating unit in the DSP 6 for a predetermined time period, at STEP S12. In this embodiment, when the propagation time is measured for the channel of the subwoofer RC, the frequency of the bust signal is set to 100 Hz, for example.

Upon initiating the output of the burst signal, the DSP 6 acquires the picked-up audio data D1 using the microphone MC for a predetermined time period and stores the acquired picked-up audio data D1 in the memory, at STEP S13. Thus, the DSP 6 acquires and retains the audio output of the subwoofer RC driven by the burst signal.

Figure 5:
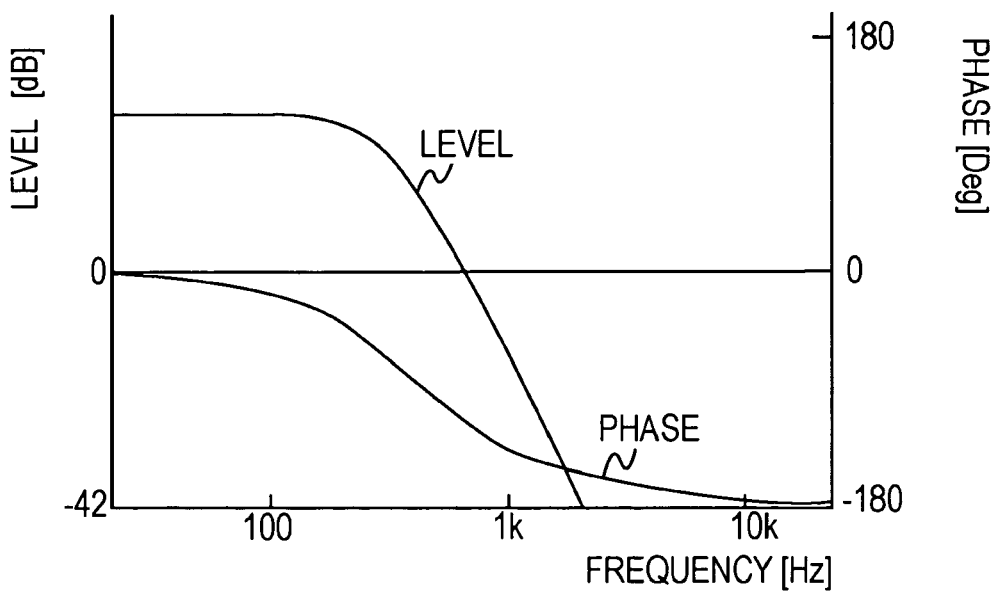
FIG. 5 is a characteristic curve illustrating a characteristic obtained through a first filtering process performed in the processing procedure of FIG. 1.

Subsequently, the DSP 6 reads and filters the picked-up audio data D1 using an IIR filter the picked-up audio data D1 stored in the memory in sequence along the time axis, at STEP S14. In this embodiment, this IIR filter is incorporated in the DSP 6 as a program. When the propagation time is measured for the channel of the subwoofer RC, in this embodiment, a filtering process with a filtering level for a low-pass filter with a cut-off frequency of 200 Hz is applied, as shown in FIG. 5. When the propagation time of any other channel than the subwoofer RC, a filtering process for a bandpass filter whose passband is set so as to include the frequency of the burst signal is applied.

With this arrangement, the DSP 6 can remove high frequency noise from the picked-up audio data D1 corresponding to the speaker audio output which is obtained using the burst signal, by performing such IIR filtering process forward along the time axis. This filtering process is hereinafter referred to as a first filtering process. As a result of the first filtering process, the phase of the picked-up audio data D1 is changed.

Figure 6:
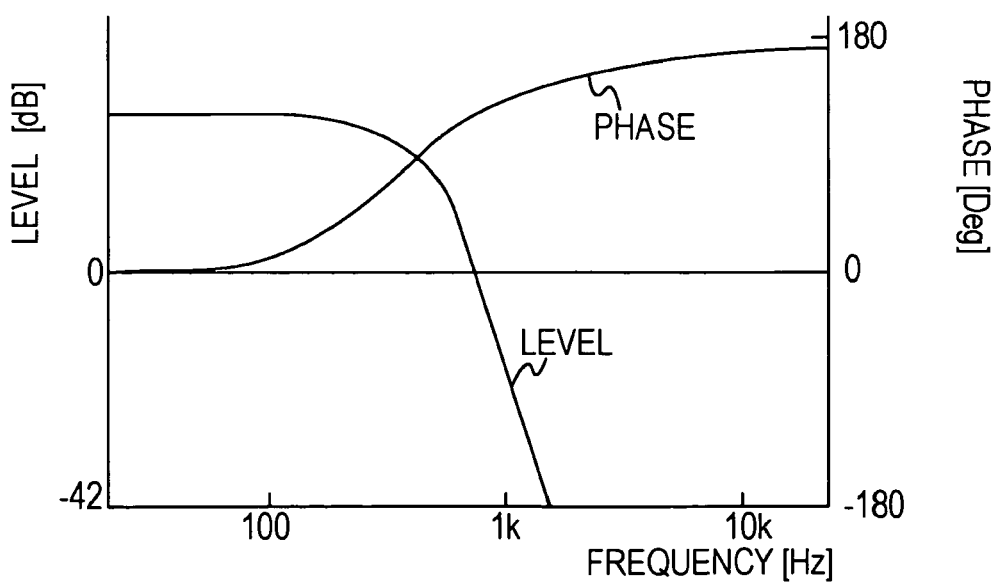
FIG. 6 is a characteristic curve illustrating a characteristic obtained through a second filtering process performed in the processing procedure of FIG. 1.

The DSP 6 stores the picked-up audio data D1 obtained as the result of the first filtering process in the memory. Then, at STEP S15, the DSP 6 reads and filters the picked-up audio data D1 stored in the memory using the IIR filter in reverse sequence along the time axis. In this filtering process, as shown in FIG. 6, the same characteristic as the first filtering process performed in STEP S14 is used. Thus, the DSP 6, by performing the filtering process backward along the time axis, can remove high frequency noise from the picked-up audio data D1 corresponding to the speaker audio output obtained using the burst signal. This backward filtering process is hereinafter referred to as a second filtering process.

Figure 7:
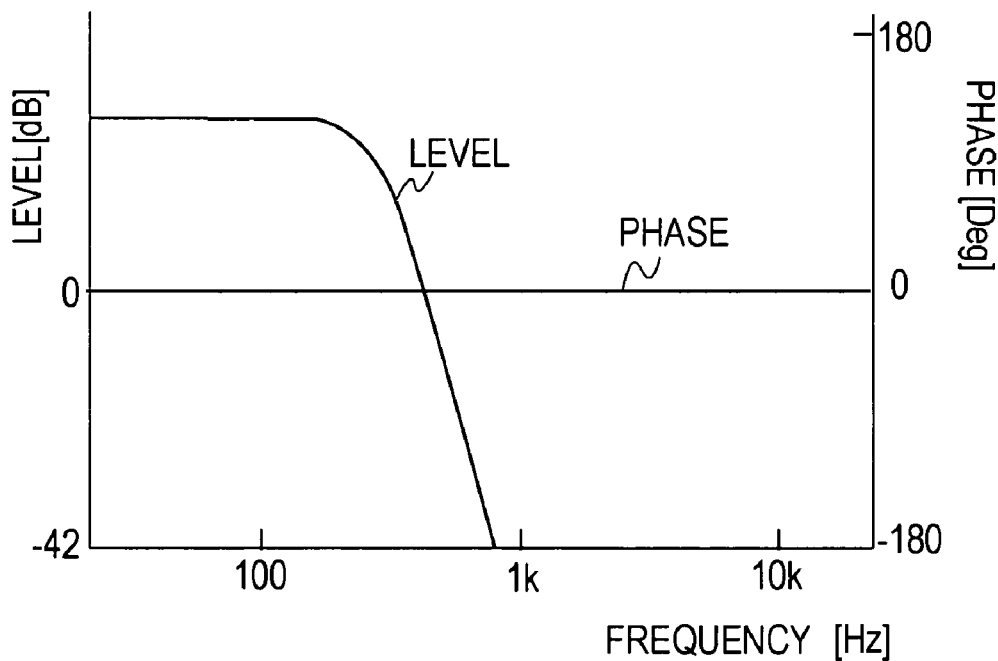
FIG. 7 is a characteristic curve illustrating an overall characteristic obtained through the processing procedure of FIG. 1.

As the result of the second filtering process, the phase characteristic of the picked-up audio data D1 is changed. However, since the picked-up audio data D1 has been filtered in the second filtering process in the order reverse to that in which the picked-up audio data D1 has been filtered in the first filtering process in terms of the time axis, the phase of the picked-up audio data D1 is changed in the second filtering process such that the phase change which has occurred in the first filtering process is canceled. Thus, the first filtering process and the second filtering process are performed so as to provide an overall characteristic as shown in FIG. 7, which permits achieving a desired amplitude characteristic without causing a change in the phase characteristic.

Figure 8:
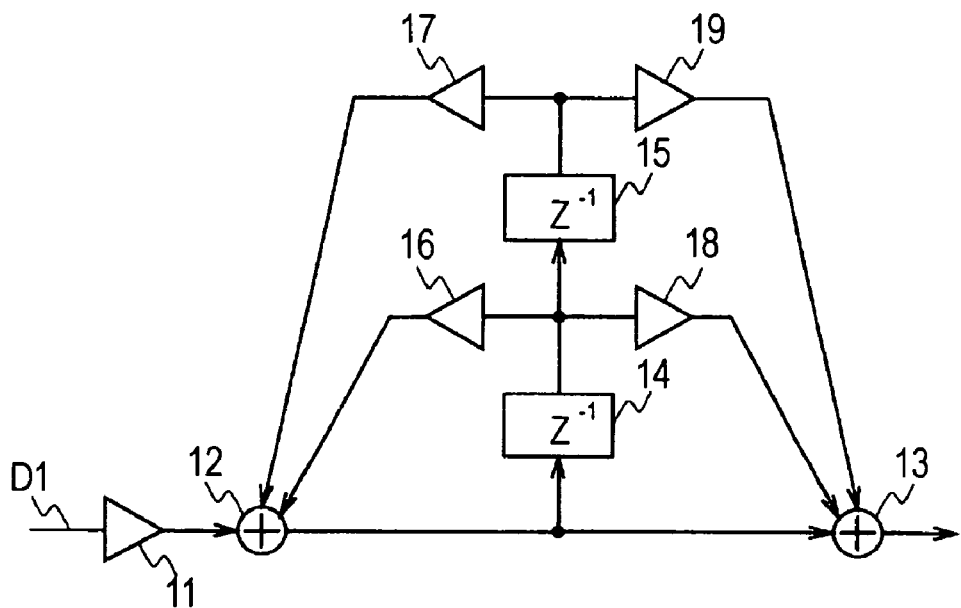
FIG. 8 illustrates an equivalent circuit used in the processing procedure of FIG. 1.

With this arrangement, the DSP 6 is provided with a second-order filter using an equivalent circuit, as shown in FIG. 8, which is intended for the processing for the subwoofer RC. This equivalent circuit is configured such that the picked-up audio data D1 is fed to an input portion of a buffer amplifier 11, and filtered data is output through adding circuits 12 and 13. Data output from the adding circuit 12 is sequentially delayed using delay circuits ($Z^{-1}$) 14 and 15 each having a delay time of one clock cycle. Data output from each of the delay circuits 14 and 15 is fed to the adding circuit 12 through buffer amplifiers 16 and 17, respectively. Data output from each of the delay circuits 14 and 15 is fed to the adding circuit 13 through buffer amplifiers 18 and 19, respectively. The data output through the adding circuits 12 and 13 is stored in the memory in the DSP 6. Then, the stored output data is input to the input portion in sequence backward along the time axis and similarly processed by each circuit in the equivalent circuit.

Figure 9:
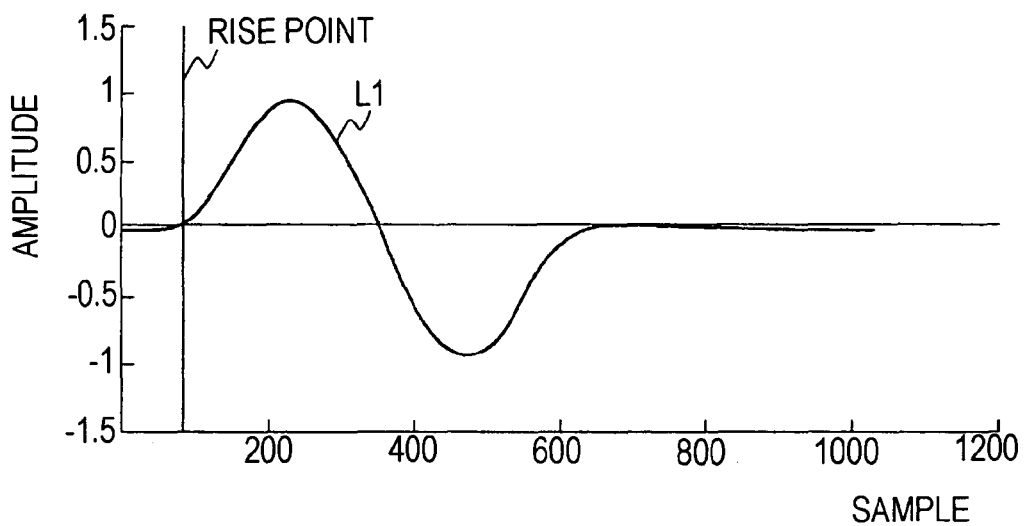
FIG. 9 is a signal waveform diagram illustrating a burst signal.
Figure 10:
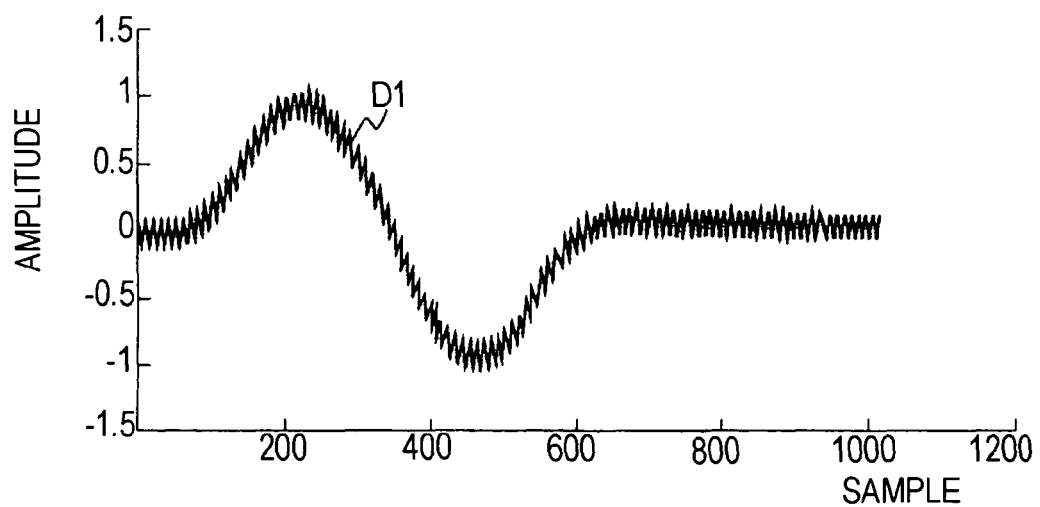
FIG. 10 is a signal waveform diagram illustrating picked-up audio data on which noise is superimposed.
Figure 11:
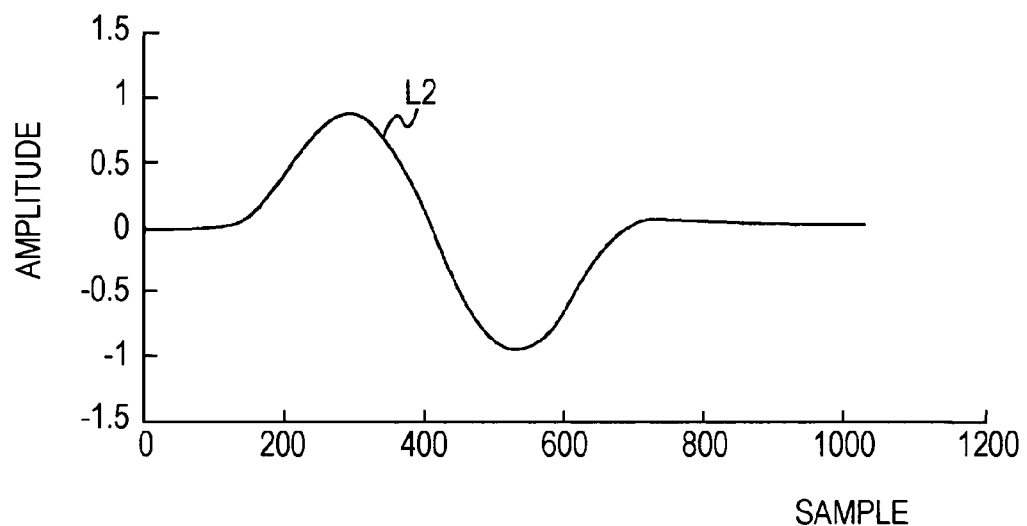
FIG. 11 is a signal waveform diagram illustrating a result of a first filtering process performed on the picked-up audio data of FIG. 10.
Figure 12:
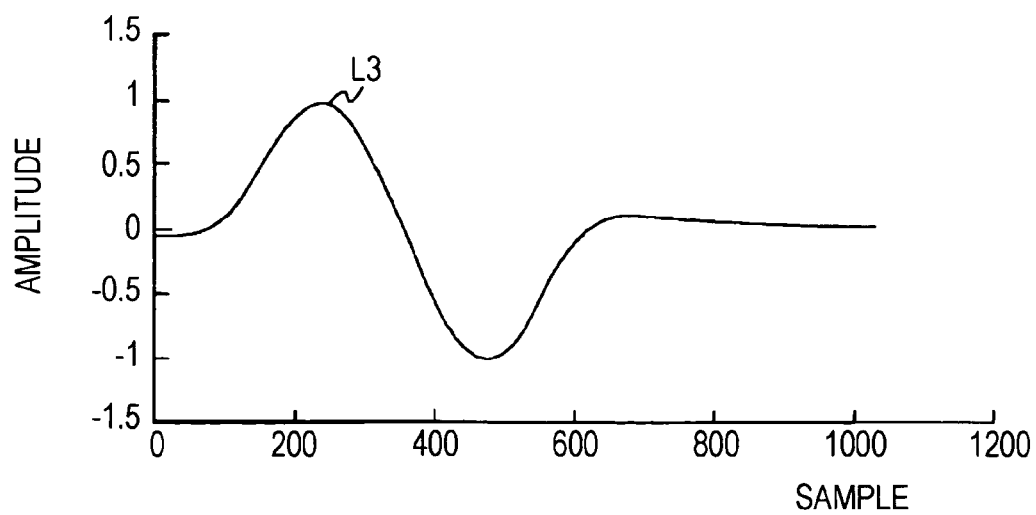
FIG. 12 is a signal waveform diagram illustrating a result of a second filtering process performed on the picked-up audio data of FIG. 10.
Figure 13:
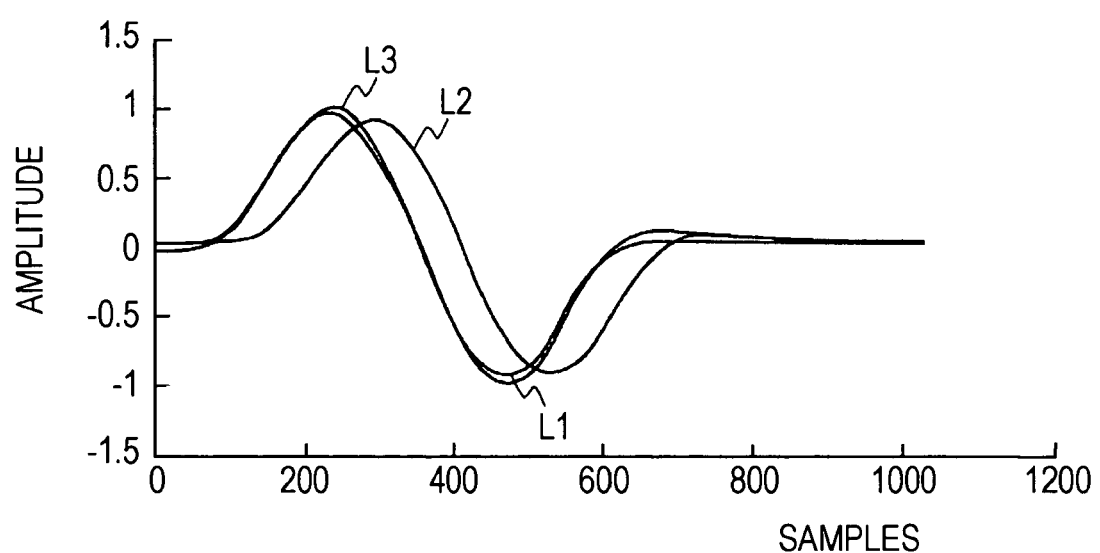
FIG. 13 is a signal wave form diagram illustrating results of filtering processes to be compared.

FIG. 9 illustrates a signal waveform of a test signal L1 sampled at 1 kHz. FIG. 10 illustrates a signal waveform obtained when a noise component is mixed into the test signal L1 using a 10 kHz sine wave signal, so as to produce a simulation of the picked-up audio data D1 corresponding to the speaker audio output actually obtained by the microphone MC. FIG. 11 illustrates a waveform of a signal L2 obtained when the signal, which has been superimposed with the noise as shown in FIG. 10, is filtered forward along the time axis (i.e., the first filtering process). FIG. 12 illustrates a waveform of a signal L3 obtained when the signal L2 is further filtered backward along the time axis (i.e., the second filtering process). FIG. 13 illustrates the waveforms of the signals L1 to L3 to be compared. As it can be seen from FIG. 13, the delay time which has occurred in the first filtering process is compensated by the second filtering process.

Thus, the DSP 6 removes noise from the burst signal corresponding to the picked-up audio data D1 without producing time variation and then stores the result obtained from the filtering processes in the memory.

Referring back to FIG. 1, the DSP 6 sequentially reads the stored picked-up audio data D1 along the time axis and detects a rise and fall of a signal level. In accordance with the timings of the detected rise and fall of the signal level, the DSP 6 determines the propagation time of the speaker audio output, at STEP S16.

At STEP S17, the DSP 6 determines whether or not the measurement processing has been performed for every channel. If the result of the determination in STEP S17 is negative, the processing procedure proceeds to STEP S18 in which processing for switching to another channel intended for the next measurement processing is performed, and then returns to STEP S12.

Thus, the DSP 6 completes the processing steps from STEP S12 to STEP S16 for every one of the six channels of the speakers FC to RR to measure the propagation time of the audio output of every one of the speakers, and then terminates the processing procedure, at STEP S19. Then, the DSP 6 returns to the original processing procedure described with reference to FIG. 4.

2. Operation of Preferred Embodiment

In the car audio system 1 having the configuration described above, audio data corresponding to an audio content provided by the source 5 is processed by the DSP 6 and then output to the channel of each of the speakers FC to RR. In each of the channels, the digital-analogue converter 2 converts the audio data fed from the DSP 6 into an analogue signal, and then a volume is set by the preamplifier 3. An output signal from the preamplifier 3 drives one of the speakers, which as a result provides a user the audio content of the source 5.

It is necessary to consider that such a car audio system 1 is installed inside a vehicle, which is a small, closed space. Therefore, it is more likely that a resonance occurs at a certain frequency when the audio content is used in the vehicle, which negatively affects a frequency characteristic, as compared with a case where the audio content is used in a house, for example. In addition, it is difficult for a user to listen to the audio content at the optimum listening position. For example, in the driving seat, as shown in FIG. 3, the user listens to the audio content at a position near the speaker FR which is located in the right-front door, which results in unstable localization of a sound image.

Thus, in the car audio system 1, processing for setting a sound field is performed by the DSP 6 in accordance with a user operation, and the characteristics of the sound field are measured, as described with reference to FIG. 4. On the basis of the result of the sound field characteristic measurement, the frequency characteristic associated with driving of each speaker and the delay time of the audio data for each speaker are set so that the sound field is optimized.

Specifically, in the car audio system 1, a test signal is selectively and sequentially output to each channel associated with driving of the individual speakers FC to RR. By detecting a response to the test signal from the microphone MC, the connection between each channel and the corresponding speaker is verified. For each channel whose connection to the corresponding speaker has been verified, a test signal is selectively and sequentially output and a response to the test signal from the microphone MC is detected, and thus the volume is set. In accordance with the set volume, each channel is selectively and sequentially driven by the test signal for the characteristic measurement. Then, by analyzing the response obtained from the microphone MC, the sound field characteristics are sequentially measured.

In the above procedure, as shown in FIG. 1, the selected speaker is driven by a burst signal as the test signal, and thus picked-up audio data D1 is acquired. The picked-up audio data D1 is filtered by an IIR filter so that noise is removed. In this filtering processing, a first filtering process is performed in which the picked-up audio data D1 is filtered along the time axis. Then, using the same characteristics as applied in the first filtering process, a second filtering process is performed in which the picked-up audio data D1 is filtered backward along the time axis. With this arrangement, a phase delay occurs as the result of the second filtering process such that a phase delay which has occurred in the first filtering process is canceled. Consequently, the noise can removed without producing a phase delay. Thus, according to this embodiment, the signal propagation time can be measured with precision even in a high-noise environment.

Further, employing the IIR filter for such filtering processes permits simplification of configuration for the signal propagation time measurement. More specifically, in a case where a FIR filter with a linear phase characteristic is employed, a large number of taps is necessary, which results in the necessity of a memory with a large capacity and an increase in the amount of processing for the filtering processes. For example, if a low-pass FIR filter having a cut-off frequency of 200 Hz is applied, approximately several hundred to one thousand of taps would be necessary. Accordingly, a buffer memory and a coefficient memory each having storage capacity of approximately several hundred bytes to thousand bytes would also be necessary. However, if an IIR filter is employed as described in this embodiment, the filtering processes can be implemented only with a memory of approximately 2 bytes and operation processing composed of about ten processing steps.

According to the present embodiment described above, when the propagation time of audio output of a speaker is measured by driving the speaker using a test signal, a burst signal is used as the test signal and audio is picked up by a microphone. Then, an output signal of the microphone is filtered by an IIR filter forward along the time axis and then backward along the time axis. This allows precise measurement of the propagation time with a simple mechanism even under a condition where much noise is present.

Thus, the present embodiment can be implemented in a system having a plurality of speakers, and a delay time is set for audio data for driving of each of the speaker, such that differences, which occur between each of the speakers, in the propagation time of the audio output, are corrected. Thus, the characteristics of the sound field can be optimized.

Embodiment 2

In the foregoing embodiment, the case is described in which the filtering process is performed along the time axis, and then the other filtering process is performed backward along the time axis. However, the present invention is not limited to the case, and the order of these filtering processes can be reversed.

Moreover, in the foregoing embodiment, the case is described in which the filtering processes are performed using a second-order low-pass filter. However, the present invention is not limited to the case, and the filtering processes can be performed using various characteristics.

In addition, in the foregoing embodiment, the case is described in which the audio system for 5.1 channel audio is employed. However, the present invention is not limited to the case, and other audio systems for various channel numbers can be employed.

Further, in the foregoing embodiment, the case is described in which frequency characteristics and delay times are adjusted for all of the plurality of channels of the speakers, using a DSP. However, the present invention is not limited to the case, and the frequency characteristic and the delay time can be adjusted for each channel.

Furthermore, in the foregoing embodiment, the case is described in which a sound field is corrected for a car audio system. However, the present invention is not limited to the case and can be implemented in an audio system for use in a house, for example. In addition, the present invention can be implemented in a case where only the propagation time of speaker audio output is measured.

It should be understood by those skilled in the art that various modifications, combinations, sub-combinations and alterations may occur depending on design requirements and other factors insofar as they are within the scope of the appended claims or the equivalents thereof.

What is claimed is:

1. A sound field measurement apparatus comprising:
a signal generating unit for outputting a burst signal;
a driving unit for driving a speaker using the burst signal;
a microphone for picking up an audio output from the speaker;
an analog-digital converter for performing analog-digital conversion processing on an output signal from the microphone and outputting picked-up audio data;
a filtering unit for performing filtering processing on the picked-up audio data; and
an analyzing unit for determining a propagation time of the audio output from the speaker to the microphone in accordance with data output from the filtering unit,
wherein the filtering unit is an IIR filter configured to filter the picked-up audio data forward along a time axis and then filter the picked-up audio data backward along the time axis, or an IIR filter configured to filter the picked-up audio data backward along the time axis and then filter the picked-up audio data forward along the time axis.

2. The sound field measuring apparatus of claim 1,
wherein a plurality of the speakers are provided,
wherein the driving unit is provided with a driving channel for driving each of the speakers, and
wherein analyzing unit measures the propagation time for each of the speakers and sets a delay time to audio data used for driving of each of the speakers so as to correct a difference between the propagation times.

3. A sound field measuring method comprising the steps of:
driving a speaker using a burst signal;
picking up an audio output from the speaker using a microphone;
performing analog-digital conversion processing on an output signal from the microphone to generate picked-up audio data;
performing filtering processing on the picked-up audio data; and
determining a propagation time of the audio output from the speaker to the microphone in accordance with a result of the filtering processing,
wherein the filtering step includes
a first filtering step of filtering the picked-up audio data forward along a time axis or backward along the time axis using an IIR filter, and
a second filtering step of filtering the picked-up audio data which has undergone the first filtering step backward along the time axis or forward along the time axis using the IIR filter.

* * * * *